United States Patent [19]

Kissin

[11] Patent Number: 5,258,475
[45] Date of Patent: Nov. 2, 1993

[54] CATALYST SYSTEMS FOR POLYMERIZATION AND COPOLYMERIZATION OF OLEFINS

[75] Inventor: Yury V. Kissin, East Brunswick, N.J.

[73] Assignee: Mobil Oil Corporation, Fairfax, Va.

[21] Appl. No.: 729,110

[22] Filed: Jul. 12, 1991

[51] Int. Cl.$^5$ .................. C08F 4/622; C08F 10/02
[52] U.S. Cl. .................. 526/129; 502/117; 526/150; 526/160; 526/348.5; 526/352; 556/179
[58] Field of Search .................. 526/150, 129

[56] References Cited

U.S. PATENT DOCUMENTS

| | | | |
|---|---|---|---|
| 4,404,344 | 9/1983 | Sinn et al. | 526/160 |
| 4,542,199 | 9/1985 | Kaminsky et al. | 526/160 |
| 4,874,734 | 10/1989 | Kioka et al. | 526/160 |
| 4,897,455 | 1/1990 | Welborn | 526/160 |
| 4,952,714 | 8/1990 | Welborn | 556/179 |
| 5,128,295 | 7/1992 | Porri et al. | 526/150 |

OTHER PUBLICATIONS

Racanelli et al, European Polymer Journal, 1970, vol. 6, pp. 751–761.
Porri et al. European Polymer Journal, 1969, vol. 5, pp. 1–13.
H. Sinn et al, Adv. Organomet. Chem., 18, 99 (1980).

*Primary Examiner*—Edward J. Smith
*Attorney, Agent, or Firm*—Alexander J. McKillop; Malcolm D. Keen; Marina V. Schneller

[57] ABSTRACT

The catalyst systems of this invention consist of catalyst precursors which are metallocene derivatives and cocatalysts. The cocatalysts comprise mixtures of: (i) trimethylaluminum, and (ii) at least one organotin compound selected from the group consisting of those with a general formulae:

$$R_1R_2R_3Sn-O-SnR_4R_5R_6$$

or $R_1R_2R_3Sn-OH$ or $R_1R_2SnO$ or $R_1Sn(O)OH$;

wherein $R_1$, $R_2$, $R_3$, $R_4$, $R_5$ and $R_6$ are $C_1$–$C_{20}$ alkyl groups.

32 Claims, No Drawings

CATALYST SYSTEMS FOR POLYMERIZATION AND COPOLYMERIZATION OF OLEFINS

BACKGROUND OF THE INVENTION

1. Field of the Invention

The present invention relates to metallocene-based catalyst precursors activated with cocatalysts comprising mixtures of at least two compounds, to the resulting catalyst compositions, and to the use thereof in a process of polymerizing and copolymerizing olefins.

2. Description of Related Art

It is known that metallocene complexes of certain transition metals, such as titanium, zirconium and hafnium, activated with aluminum compounds of the methylaluminoxane type, produce olefin polymers and copolymers, such as ethylene and propylene homopolymers, ethylene-butene and ethylene-hexene copolymers, e.g., see Kaminsky et al, U.S. Pat. No. 4,542,199 and Sinn et al, U.S. Pat. No. 4,404,344, the entire contents of both of which are incorporated herein by reference. Methylaluminoxane is commonly produced by reacting trimethylaluminum with water or with hydrated inorganic salts, such as $CuSO_4.5H_2O$ or $Al_2(SO_4)_3.15H_2O$. Methylaluminoxane can be also generated in situ in polymerization reactors by adding to them trimethylaluminum and water or water-containing inorganic salts. However, although such combinations of metallocene-based catalysts and methylaluminoxane are very effective olefin polymerization catalysts, the methylaluminoxane cocatalysts are expensive and can be utilized efficiently only if the olefin polymerization reactions are carried out in aromatic solvents (usually in toluene) and thus do not lend themselves to gas phase reaction. Accordingly, a need exists in the art for alternative cocatalysts for metallocene-based catalysts.

Mixtures of certain alkylaluminum halides, such as $Al(C_2H_5)_2Cl$, and alkyldistannoxanes, such as $[(C_2H_5)_3Sn]_2O$, in aromatic and aliphatic hydrocarbons activate cobalt complexes soluble in these solvents, such as cobalt diacetylacetonate and cobalt triacetylacetonate, in polymerization of butadiene and 1,3-pentadiene, e.g., see P. Racanelli and L. Porri, Italian Patent 745741 (1965).

It is the object of the present invention to provide a cocatalyst for metallocene-based olefin polymerization catalyst precursors, the said cocatalysts comprising mixtures of at least two compounds.

It is an object of the invention to provide a catalyst including a metallocene derivative which can be used in ethylene homopolymerization or copolymerization undertaken under gas phase conditions.

SUMMARY OF THE INVENTION

The catalyst systems of this invention consist of catalyst precursors and cocatalysts. The cocatalysts of this invention comprise mixtures of: (i) trimethylaluminum, and (ii) at least one of the organotin compounds with general formulae:

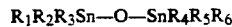

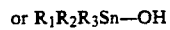

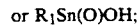

where $R_1$, $R_2$, $R_3$, $R_4$, $R_5$ and $R_6$ are the same or different $C_1-C_{20}$ alkyl groups or aryl groups or alkylaryl groups.

These cocatalysts are used in combination with catalyst precursors which comprise one or several metallocene derivatives of transition metals having the formula:

wherein Cp is a cyclopentadienyl or a substituted cyclopentadienyl group; m is 1 or 2; M is a metal belonging to the group consisting of titanium, zirconium and hafnium; and A and B belong to the group consisting of a halogen, hydrogen, a C1-C6 alkyl group, or a group of the following general formula:

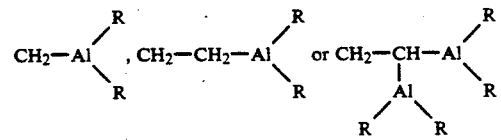

where R is a $C_1-C_{10}$ alkyl group, hydrogen or a halogen; providing that $m+n+p$ is equal to the valence of the metal M.

The catalyst compositions comprising the catalyst precursors and the cocatalysts polymerize ethylene, alpha-olefins, e.g., propylene, 1-butene or 1-hexene, or mixtures thereof, and cycloolefins, such as cyclopentene, to homopolymers or copolymers having density of about 0.85 to about 0.97 g/cc. The olefin polymerization reactions with these catalyst compositions can be carried out both in aromatic and aliphatic hydrocarbon media, as well as in the gas phase.

DETAILED DESCRIPTION OF THE INVENTION

The catalyst systems of this invention consist of catalyst precursors and cocatalysts. The cocatalysts, also known as catalyst promoters or activators, comprise mixtures of at least two compounds: (i) trimethylaluminum, $Al(CH_3)_3$, and (ii) at least one of the organotin compounds with general formulae:

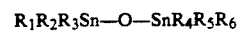

In the organotin compounds, $R_1$, $R_2$, $R_3$, $R_4$, $R_5$ and $R_6$ are $C_1-C_{20}$ alkyl groups, preferably short-chain $C_1-C_8$ alkyl groups, such as methyl, ethyl, n-propyl, n-hexyl, n-octyl or an isobutyl group. In one embodiment of the invention, bis(tri-n-butyltin)oxide, bis(triethyltin)oxide, trimethyltin hydroxide, dimethyltin oxide, di(n-butyl)tin oxide and n-butyltin hydroxide oxide are the preferred organotin compounds. In other embodiments of the invention, $R_1$, $R_2$, $R_3$, $R_4$, $R_5$ and $R_6$ are aryl groups, such as phenyl group and tolyl groups, or arylalkyl groups such as benzyl groups. These cocatalysts are used in combination with catalyst precursors. In certain embodiments the organotin compound is $R_1R_2R_3SnOH$, $R_1R_2SnO$ or $R_1Sn(O)OH$, is solid, and is a support for the metallocene catalyst precursor. The catalyst precursors of this invention comprise one or several metallocene derivatives of transition metals and have the formula: $Cp_mMA_nB_p$ wherein Cp is a cyclopentadienyl or a substituted cyclopentadienyl group; m is 1 or 2; M is a transition metal atom of a Group 4b or Group 5b of the Periodic Table; and A and B belong to the group consisting of a halogen atom, a hydrogen atom, an alkyl group, an alkylaryl group or a group of the following general formula:

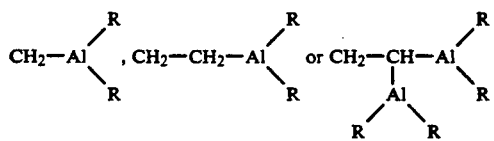

where R is a $C_1$-$C_{10}$ alkyl group, hydrogen or a halogen; providing that m+n+p is equal to the valence of the metal M. In the above formula of the metallocene compound, the preferred transition metal atom M belongs to the group of titanium, zirconium or hafnium. In the above formula of the metallocene compound, the Cp group is an unsubstituted, a mono- or a polysubstituted cyclopentadienyl group. The substituents on the cyclopentadienyl group can be preferably straight-chain $C_1$-$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bycyclic or tricyclic moiety. In the case when m in the above formula of the metallocene compound is equal to 2, the cyclopentadienyl groups can be also bridged by polymethylene or dialkylsilane groups, such as $-CH_2-$, $-CH_2-CH_2-$, $-CR'R''-$ and $-CR'R''-CR'R''-$ where R' and R'' are short alkyl groups or hydrogen, $-Si(CH_3)_2-$, $Si(CH_3)_2-CH_2-CH_2-Si(CH_3)_2-$ and similar bridge groups. If the A and B substituents in the above formula of the metallocene compound are halogen atoms, they belong to the group of fluorine (F), chlorine (Cl), bromine (Br) or iodine (I). If the substituents A and B in the above formula of the metallocene compound are alkyl groups, they are preferably straight-chain or branched $C_1$-$C_8$ alkyl groups, such as methyl, ethyl, n-propyl, isopropyl, n-butyl, isobutyl, n-pentyl, n-hexyl or n-octyl. Suitable metallocene compounds include bis(cyclopentadienyl)-metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is preferably zirconium and hafnium, halide groups are preferably chlorine and the alkyl groups are $C_1$-$C_6$ alkyls. Illustrative, but non-limiting examples of metallocenes include bis(cyclopentadienyl)zirconium dichloride, bis(cyclopentadienyl)hafnium dichloride, bis(cyclopentadienyl)titanium dichloride, bis(cyclopentadienyl)zirconium dimethyl, bis(cyclopentadienyl)zirconium hydridochloride, bis(pentamethylcyclopentadienyl)zirconium d-ichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene [bis(4,5,6,7-tetrahydro-1-indenyl)] zirconium dichloride. The metallocene compounds utilized within the embodiment of this art can be used as crystalline solids, as solutions in aromatic hydrocarbons or in a supported form. Various porous and nonporous solids commonly used for the manufacture of olefin-polymerization catalysts can be also used for supporting the metallocene compounds. They include silica, alumina, aluminum phosphates, magnesium dichloride and mixtures thereof. Solid organotin compounds used as components of the cocatalysts within the embodiment of this art also can be used as supports. In the latter case, the polymerization catalysts consist of two separate constituents, one being $Al(CH_3)_3$ and the second a metallocene compound deposited on a solid organotin compound. The most common techniques for depositing the metallocene compounds on the supports include dissolution of the metallocene compounds in appropriate solvents, such as aromatic hydrocarbons, halogenated aromatic hydrocarbons, ethers, cyclic ethers or esters; mixing the solutions with the supports and removing the solvents at increased temperatures. The amounts of the deposited metallocenes with respect to the support can vary from 0.01 to 2 millimole of the metallocene compounds per gram of support, with 0.05 to 0.5 millimole of the metallocene compounds per gram of support being the most preferable ratio. The relative ratios of the $Al(CH_3)_3$ to the organotin compounds are not critical for the preparation of the cocatalysts but they may be critical to the polymerization activity of the activated catalyst compositions. Thus, the relative amounts of $Al(CH_3)_3$ and oxygen (O) in the organotin compounds are such that the molar ratio of Al:O is greater than 1, for example ranging from about 1.01:1 to about 100:1, preferably about 1.1:1 to about 5:1. Conversely, the low molar ratios of Al:O, e.g., less than or equal to 0.99:1, produce catalyst compositions having relatively low activity. Neither $Al(CH_3)_3$ nor the organotin compounds, if used separately with the metallocene catalyst precursors of the invention, are capable of polymerizing olefins. The relative amounts of oxygen in the cocatalyst and the transition metal in the catalyst precursor can be varied in a broad range, from 10:1 to 30,000:1 and oxygen:transition metal molar ratio of about 500:1 to about 2,000:1, with the ratios from 500:1 to 3000:1 being the most preferable for high activity of the catalyst compositions.

Catalyst Activation

The catalyst precursor is combined with the cocatalyst mixture in a conventional manner. The catalyst precursor may be activated in situ by adding the precursor and the mixture of the cocatalyst components separately to the polymerization medium. The order of the mixing of the catalyst precursor and the cocatalyst components is not important. For example, the components of the cocatalyst, $Al(CH_3)_3$ and an organotin compound, can be mixed immediately prior to the introduction of the catalyst precursor, or, alternatively, the catalyst precursor and one of the components of the cocatalyst can be mixed first and the remaining component of the cocatalyst can be added later. It is also possible to combine both components of the cocatalyst before the introduction thereof into the polymerization medium, e.g., for up to about 100 hours prior to the introduction thereof into the polymerization medium at a temperature of from about 40° to about 100° C. If an organotin compound is used as a support or as a part of the support for the metallocene compound, its mixing with the second cocatalyst component, $Al(CH_3)_3$, can also be achieved either directly in the polymerization reactor or before the introduction thereof into the polymerization medium.

Polymerization

Olefins, especially ethylene and alpha-olefins, are polymerized with the catalysts prepared according to the present invention by any suitable process. The reaction in stirred reactors is carried out in a suitable liquid reaction media, e.g., aromatic or aliphatic hydrocarbons, such as toluene or heptane, respectively. The polymerization reactions can be also carried out in gas-phase reactors, including fluid-bed reactors. The catalyst activity and the structure of the polymer products are influenced by the nature of the monomer or comonomers, the type of the liquid medium and by the Al:O and O:Zr molar ratios, as will be apparent to those skilled in the art from the data of the Examples. The linear polyethylene polymers prepared in accordance with the present invention are homopolymers of ethylene or copolymers of ethylene with one or more $C_3-C_{10}$ alpha-olefins. Thus, ethylene copolymers having one type of alpha-olefin monomeric units are possible as well as terpolymers having ethylene and two types of alpha-olefin monomeric units. Particular examples of such polymers include ethylene/propylene copolymers, ethylene/1-butene copolymers, ethylene/1-hexene copolymers, ethylene/1-octene copolymers, ethylene/4-methyl-1-pentene copolymers, ethylene/1-butene/ 1-hexene terpolymers, ethylene/propylene/1-hexene terpolymers and ethylene/propylene/1-butene terpolymers. Ethylene/1-butene and ethylene/1-hexene copolymers are the most preferred copolymers polymerized in the process of and with the catalyst of this invention. The ethylene copolymers produced in accordance with the present invention preferably contain at least about 80 percent by weight of ethylene units. The cocatalysts of this invention can be used with the catalyst precursors of this invention to polymerize propylene and other alpha-olefins and to copolymerize them. The structure of alpha-olefin polymers prepared with the cocatalysts and the catalyst precursors of this invention depends on the structure of the cyclopentadienyl ligands attached to the metal atom in the catalyst precursor molecule. The cocatalyst compositions of this invention can be used with the catalyst precursors of this invention to polymerize cycloolefins such as cyclopentene. The following examples further illustrate the essential features of the invention. However, it will be apparent to those skilled in the art that the specific reactants and reaction conditions used in the Examples do not limit the scope of the invention. The properties of the polymers produced in the Examples and any calculated process parameters were determined by the following test methods: Melt Index (MI), $I_2$: ASTM D-1238—Condition E—Measured at 190° C—reported as grams per 10 minutes. Melting points of polymerization products were measured by the DSC (Differential Scanning Calorimetry) method. The sample heating rate of 2° C./min was employed. Compositions of ethylene-hexene copolymers were measured by the infrared spectroscopic method, as described in the article of T. E. Nowlin, Y. V. Kissin and K. P. Wagner published in 1988 in the Journal of Polymer Science:Part A:Polymer Chemistry, volume 26, pages 755-764.

EXAMPLE 1

A stainless-steel, 0.5-liter autoclave equipped with a stirrer, a thermocouple and several ports for adding reaction components was purged with nitrogen flow at 120° C. for 1 hour, cooled and filled with 100 cc of dry toluene. The catalyst components were added to the autoclave in the following sequence: (a) 2.5 cc of 20 wt. % solution of $Al(CH_3)_3$ in heptane; (b) 0.6 cc of $[(n-C_4H_9)_3Sn]_2O$, after which the autoclave was heated to 80° C.; (c) 1 cc of the solution of $(C_5H_5)_2ZrCl_2$ in toluene containing $3.4 \times 10^{-3}$ millimole of the Zr compound. Ethylene was admitted to the autoclave to maintain a total pressure of 180 psig. The polymerization reaction was carried out for 60 min to yield 53.8 g of low molecular weight polyethylene with the $I_2$ value of 146.

EXAMPLE 2

The autoclave (the same as in Example 1) was filled with 250 cc of dry heptane. The catalyst components were added to the autoclave in the following sequence: (a) 4.0 cc of 20 wt. % solution of $Al(CH_3)_3$ in heptane; (b) 1.0 cc of $[(n-C_4H_9)_3Sn]_2O$, after which the autoclave was heated to 80° C.; (c) 2 cc of a solution of $(C_5H_5)_2ZrCl_2$ in toluene containing $6.8 \times 10^{-3}$ millimole of the Zr compound. Ethylene was admitted to the autoclave to maintain a total pressure of 180 psig. The polymerization reaction was carried out for 40 min to yield 46.3 g of polyethylene with the $I_2$ value of 2.1.

EXAMPLE 3

The autoclave (the same as in Example 1) was filled with 250 cc of dry hexane and 50 cc of dry 1-hexene. The catalyst components were added to the autoclave in the following sequence: (a) 2.0 cc of 20 wt. % solution of $Al(CH_3)_3$ in heptane; (b) 1.0 cc of $[(n-C_4H_9)_3Sn]_2O$, after which the autoclave was heated to 70° C.; (c) 1 cc of a solution of $(C_5H_5)_2ZrCl_2$ in toluene containing $3.4 \times 10^{-3}$ millimole of the Zr compound. Ethylene was admitted to the autoclave to maintain a total pressure of 180 psig. The polymerization reaction was carried out for 60 min to yield 43.9 g of ethylene/hexene copolymer with the $I_2$ value of 34. The copolymer contained 2.6 mol. % of 1-hexene units and had the melting point of 112° C.

EXAMPLES 4, 5 AND COMPARATIVE EXAMPLES 4', 5'

In order to compare two types of cocatalysts for metallocene catalysts, two series of parallel ethylene-hexene copolymerization reactions were carried out using the autoclave described in Example 1. In each experiment, the autoclave was charged with 200 cc of dry heptane and 50 cc of dry 1-hexene. Two types of cocatalysts were used: in Examples 4 and 5 - mixtures of $Al(CH_3)_3$ and $[(n-C_4H_9)_3Sn]_2O$, and in examples 4' and 5'-methylaluminoxane. In Examples 4 and 4', 0.3 cc of a solution of $(C_5H_5)_2ZrCl_2$ in toluene containing 1.0 $10^{-3}$ millimole of the Zr compound were used, and in Examples 5 and 5' 0.2 cc of this solution containing $6.2 \times 10^{-4}$ millimole of the Zr compound were used. Reaction temperatures were 70° C. in Examples 4 and 4' and 60° C. in Examples 5 and 5'. In each experiment, ethylene was admitted to the autoclave to maintain a total pressure of 180 psig. Under these conditions, the rates of ethylene consumption were constant in time over periods of 30 min. The results of these experiments are given in Table 1.

TABLE 1

| Ex. | Temp. °C. | Cocatalyst | Al:Zr ratio | O:Zr ratio | Rate l/min mmol Zr | $C_H$* mol. % | $I_2$ |
|---|---|---|---|---|---|---|---|
| 4  | 70 | AlMe$_3$—(n-Bu$_3$Sn)$_2$O | 5200 | 3300 | 980 | 2.0 | 3.3 |
| 4' | 70 | Methylaluminoxane | 4600 | 3200 | 840 | 1.8 | 24.3 |
| 5  | 60 | AlMe$_3$—(n-Bu$_3$Sn)$_2$O | 5100 | 3200 | 590 | 2.6 | 0.8 |
| 5' | 60 | Methylaluminoxane | 4600 | 3200 | 320 | 1.6 | 8.0 |

*$C_H$ - mole % of 1-hexene units in copolymer

Comparison of Examples 4, 5, 4' and 5' shows that, at the same [O]:[Zr] ratios, the cocatalyst system consisting of AlMe$_3$ and (n-Bu$_3$Sn)$_2$O affords higher polymerization rates than methylaluminoxane and produces polymers with lower I$_2$ values.

EXAMPLE 6

The autoclave (the same as in Example 1) was filled with 250 cc of dry hexane and 50 cc of dry 1-hexene. The catalyst components were added to the autoclave in the following sequence: (a) 2.0 cc of 20 wt. % solution of Al(CH$_3$)$_3$ in heptane; (b) 1.0 cc of [(n-C$_4$H$_9$)$_3$Sn]$_2$O, after which the autoclave was heated to 70° C.; (c) 3 cc of a solution of (C$_5$H$_5$)$_2$HfCl$_2$ in toluene containing 8.4 10$^{-3}$ millimole of the Hf compound. Ethylene was admitted to the autoclave to maintain a total pressure of 180 psig. The polymerization reaction was carried out for 120 min to yield 20.2 g of ethylene/hexene copolymer with the I$_2$ value of 14.8. The copolymer contained 3.1 mol. % of 1-hexene units and had the melting point of 113° C.

EXAMPLE 7

The autoclave (the same as in Example 1) was filled with 250 cc of dry hexane and 50 cc of dry 1-hexene. The catalyst components were added to the autoclave in the following sequence: (a) 2.0 cc of 20 wt. % solution of Al(CH$_3$)$_3$ in heptane; (b) 2.0 cc of [(n-C$_4$H$_9$)$_3$Sn]$_2$O, after which the autoclave was heated to 70° C.; (c) 2 cc of a solution of (C$_5$H$_5$)$_2$TiCl$_2$ in toluene containing 8.0×10$^{-3}$ millimole of the Ti compound. Ethylene was admitted to the autoclave to maintain a total pressure of 180 psig. The polymerization reaction was carried out for 50 min to yield 19.8 g of ethylene/hexene copolymer with the I$_2$ value of 14.8. The copolymer contained 4.9 mole % of 1-hexene units and had the melting point of 116° C.

EXAMPLE 8

The autoclave (the same as in Example 1) was filled with 250 cc of dry heptane and 50 cc of dry 1-hexene. The catalyst components were added to the autoclave in the following sequence: (a) 2.5 cc of 20 wt. % solution of Al(CH$_3$)$_3$ in heptane; (b) 1.1 cc of [(n-C$_4$H$_9$)$_3$Sn]$_2$O, after which the autoclave was heated to 60° C.; (c) 0.5 cc of a solution of (indenyl)$_2$ZrCl$_2$ in toluene containing 3.2×10$^{-4}$ millimole of the Zr compound. Ethylene was admitted to the autoclave to maintain a total pressure of 180 psig. The polymerization reaction was carried out for 60 min to yield 14.4 g of ethylene/hexene copolymer. The copolymer contained 2.7 mol. % of 1-hexene units and had the melting point of 119.5° C.

EXAMPLE 9

The autoclave (the same as in Example 1) was filled with 100 cc of dry toluene and 25 cc of dry 1-hexene. The catalyst components were added to the autoclave in the following sequence: (a) 5.0 cc of 20 wt. % solution of Al(CH$_3$)$_3$ in heptane; (b) 2.0 cc of [(n-C$_4$H$_9$)$_3$Sn]$_2$O, after which the autoclave was heated to 70° C.; (c) 1.3 cc of a solution of (C$_5$H$_5$)$_2$Zr(CH$_3$)$_2$ in toluene containing 5.2×10$^{-3}$ millimole of the Zr compound. Ethylene was admitted to the autoclave to maintain a total pressure of 180 psig. The polymerization reaction was carried out for 60 min to yield 20.5 g of ethylene/hexene copolymer with the I$_2$ value of 1.0. The copolymer contained 1.3 mol. % of 1-hexene units and had the melting point of 133.8° C.

EXAMPLE 10

The autoclave (the same as in Example 1) was filled with 200 cc of dry heptane and 50 cc of dry 1-hexene. The catalyst components were added to the autoclave in the following sequence: (a) 2.5 cc of 20 wt. % solution of Al(CH$_3$)$_3$ in heptane; (b) 1.1 cc of [(n-C$_4$H$_9$)$_3$Sn]$_2$O, after which the autoclave was heated to 60° C.; (c) 1.0 cc of a solution of (C$_5$H$_5$)$_2$Zr(H)Cl in toluene containing 3.9×10$^{-3}$ millimole of the Zr compound. Ethylene was admitted to the autoclave to maintain a total pressure of 180 psig. The polymerization reaction was carried out for 60 min to yield 24.2 g of ethylene/hexene copolymer with the I$_2$ value of 2.4. The copolymer contained 2.8 mol. % of 1-hexene units and had the melting point of 116.5° C.

EXAMPLE 11

The autoclave (the same as in Example 1) was filled with 200 cc of dry heptane and 50 cc of dry 1-hexene. The catalyst components were added to the autoclave in the following sequence: (a) 2.5 cc of 20 wt. % solution of Al(CH$_3$)$_3$ in heptane; (b) 1.1 cc of [(n-C$_4$H$_9$)$_3$Sn]$_2$O, after which the autoclave was heated to 60° C.; (c) 0.2 cc of a solution of (n-C$_4$H$_9$-C$_5$H$_4$)$_2$ZrCl$_2$ (bis(n-butylcyclopentadienyl)zirconium dichloride) in toluene containing 5.7 10$^{-4}$ millimole of the Zr compound. Ethylene was admitted to the autoclave to maintain a total pressure of 180 psig. The polymerization reaction was carried out for 60 min to yield 14.3 g of ethylene/hexene copolymer with the I$_2$ value of 0.6. The copolymer contained 2.1 mol. % of 1-hexene units and had the melting point of 117.4.° C.

EXAMPLE 12

The autoclave (the same as in Example 1) was filled with 250 cc of dry hexane. The catalyst components were added to the autoclave in the following sequence: (a) 2.0 cc of 20 wt. % solution of Al(CH$_3$)$_3$ in heptane; (b) 0.179 g (CH$_3$)$_3$SnOH, after which the autoclave was heated to 80° C.; (c) 1 cc of a solution of (C$_5$H$_5$)$_2$ZrCl$_2$ in toluene containing 3.4×10$^{-3}$ millimole of the Zr compound. Ethylene was admitted to the autoclave to maintain a total pressure of 180 psig. The polymerization reaction was carried out for 50 min to yield 30.9 g of polyethylene with the I$_2$ value of 1.2.

EXAMPLE 13

The autoclave (the same as in Example 1) was filled with 250 cc of dry hexane and 50 cc of dry 1-hexene. The catalyst components were added to the autoclave in the following sequence: (a) 2.0 cc of 20 wt. % solution of $Al(CH_3)_3$ in heptane; (b) 0.169 g $(CH_3)_3SnOH$, after which the autoclave was heated to 70° C.; (c) 1 cc of a solution of $(C_5H_5)_2ZrCl_2$ in toluene containing $3.4 \times 10^{-3}$ millimole of the Zr compound. Ethylene was admitted to the autoclave to maintain a total pressure of 180 psig. The polymerization reaction was carried out for 60 min to yield 48.4 g of ethylene/hexene copolymer with the $I_2$ value of 21.5. The copolymer contained 3.0 mol. % of 1-hexene units and had the melting point of 116° C.

EXAMPLE 14

Preparation of supported catalyst. 1.0 g of silica dehydrated at 600° C. was mixed with 0.043 g of $(C_5H_5)_2ZrCl_2$ dissolved in 10 cc of dry tetrahydrofuran, and the solvent was removed by nitrogen purge at 70° C. for 2 hours polymerization.

Polymerization. The autoclave (the same as in Example 1) was filled with 250 cc of dry hexane and 70 cc of dry 1-hexene. The catalyst components were added to the autoclave in the following sequence: (a) 2.0 cc of 20 wt. % solution of $Al(CH_3)_3$ in heptane; (b) 0.8 cc of $[(n-C_4H_9)_3Sn]_2O$, after which the autoclave was heated to 70° C.; (c) 0.068 g of the supported catalyst containing 0.01 millimole of the Zr compound. Ethylene was admitted to the autoclave to maintain a total pressure of 180 psig. The polymerization reaction was carried out for 120 min to yield 69.5 g of ethylene/hexene copolymer with the $I_2$ value of 16.7, with the hexene content of 2.6 mol. % and with the melting point of 114° C.

EXAMPLE 15

Gas-phase polymerization. The autoclave (same as in example 1, but equipped with an anchor stirrer) was filled with 30 g of degassed crystalline polypropylene which served as a polymerization medium. 3 cc of 20 wt. % solution of $Al(CH_3)_3$ in heptane was added to the reactor and temperature was raised to 70° C. After that, 1.0 cc of $[(n-C_4H_9)_3Sn]_2O$ and 0.054 g of the supported catalyst described in Example 14 and containing 0.0079 millimole of the Zr compound was added. Ethylene was admitted to the reactor to a total pressure of 180 psig and the polymerization was continued for 120 min to yield 25.3 g of polyethylene.

EXAMPLE 16

The autoclave (the same as in Example 1) was filled with 200 cc of dry heptane and 50 cc of dry 1-hexene. The catalyst components were added to the autoclave in the following sequence: (a) 3.0 cc of 20 wt. % solution of $Al(CH_3)_3$ in heptane; (b) 0.356 g of $(CH_3)_2SnO$, after which the autoclave was heated to 60° C.; (c) 0.3 cc of a solution of $(C_5H_5)_2ZrCl_2$ in toluene containing $1.1 \cdot 10^{-3}$ millimole of the Zr compound. Ethylene was admitted to the autoclave to maintain a total pressure of 180 psig. The polymerization reaction was carried out for 50 min to yield 34.4 g of ethylene/hexene copolymer with the $I_2$ value of 0.7. The copolymer contained 2.4 mol. % of 1-hexene units and had the melting point of 113.1° C.

EXAMPLE 17

The autoclave (the same as in Example 1) was filled with 200 cc of dry heptane and 50 cc of dry 1-hexene. The catalyst components were added to the autoclave in the following sequence: (a) 3.0 cc of 20 wt. % solution of $Al(CH_3)_3$ in heptane; (b) 0.544 g of $(n-C_4H_9)_2SnO$, after which the autoclave was heated to 60° C.; (c) 0.3 cc of a solution of $(C_5H_5)_2ZrCl_2$ in toluene containing $1.1 \cdot 10^{-3}$ millimole of the Zr compound. Ethylene was admitted to the autoclave to maintain a total pressure of 180 psig. The polymerization reaction was carried out for 120 min to yield 36.2 g of ethylene/hexene copolymer with the $I_2$ value of 0.9. The copolymer contained 2.0 mol. % of 1-hexene units and had the melting point of 121.3° C.

EXAMPLE 18

The autoclave (the same as in Example 1) was filled with 200 cc of dry heptane and 50 cc of dry 1-hexene. The catalyst components were added to the autoclave in the following sequence: (a) 3.0 cc of 20 wt. % solution of $Al(CH_3)_3$ in heptane; (b) 0.211 g of $(n-C_4H_9)Sn(O)OH$, after which the autoclave was heated to 80° C.; (c) 1.3 cc of a solution of $(C_5H_5)_2ZrCl_2$ in toluene containing $1.1 \times 10^{-3}$ millimole of Zr compound. Ethylene was admitted to the autoclave transmission to maintain a total pressure of 180 psig. The polymerization reaction was carried out for 270 min to yield 9.0 g of ethylene/hexene copolymer.

EXAMPLE 19

Preparation of supported catalyst. 1.0 g of $(CH_3)_2SnO$ was mixed with 0.018 g of $(C_5H_5)_2ZrCl_2$ dissolved in 5 cc of dry tetrahydrofuran, and the solvent was removed by nitrogen purge at 70° C. for 2 hours.

Polymerization. The autoclave (the same as in Example 1) was filled with 200 cc of dry heptane and 50 cc of dry 1-hexene. The catalyst components were added to the autoclave in the following sequence: (a) 2.0 cc of 20 wt. % solution of $Al(CH_3)_3$ in heptane, after which the autoclave was heated to 70° C.; (b) 0.054 g of the supported catalyst containing 0.0033 millimole of the Zr compound. Ethylene was admitted to the autoclave to maintain a total pressure of 180 psig. The polymerization reaction was carried out for 120 min to yield 14.3 g of ethylene/hexene copolymer with the $I_2$ value of 1.6, with the hexene content of 4.0 mol. % and with the melting point of 104.4° C.

What is claimed is:

1. A process for polymerizing an olefin feed comprising ethylene under ethylene polymerization conditions with a catalyst comprising a catalyst precursor and a cocatalyst, wherein the catalyst precursor is a metallocene derivative of a transition metal, and wherein the cocatalyst comprises a mixture of at least two compounds: (i) trimethylaluminum, $Al(CH_3)_3$, and (ii) at least one organotin compound selected from the group consisting of:

$R_1R_2R_3Sn-OH$ or $R_1R_2SnO$ and $R_1Sn(O)OH$;

wherein $R_1$, $R_2$, $R_3$, are $C_1-C_{20}$ alkyl groups; wherein the molar ratio between Al provided by said al(CH$_3$)$_3$ and O provided by said organotin compound is greater than 1; wherein the amount of the cocatalyst and the catalyst precursor are such that the oxygen:transition metal molar ratio is about 10:1 to about 10,000:1; and recovering a linear polymeric product containing at least 80 weight percent of ethylene units.

2. The process of claim 1, wherein the catalyst precursor is selected from the group consisting of bis(cyclopentadienyl)zirconium dichloride; bis(cyclopentadienyl)hafnium dichloride; bis(cyclopentadienyl)titanium dichloride; bis(indenyl)zirconium dichloride; bis(cyclopentadienyl)zirconium dimethyl and bis(cyclopentadienyl)zirconium hydridochloride.

3. The process of claim 1, wherein the metallocene derivative of a transition metal has the formula: $Cp_mMA_nB_p$
wherein
Cp is a cyclopentadienyl or a substituted cyclopentadienyl group;
m is 1 or 2;
M is a transition metal atom of a Group 4b or Group 5b of the Periodic Table and has a valence which is equal to m+n+p; and
each of A and B is selected from the group consisting of a halogen atom, a hydrogen atom, a $C_1-C_6$ alkyl group, or a group of the following general formula:

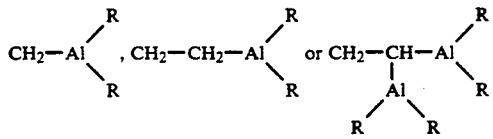

where R is a $C_1-C_{10}$ alkyl group, hydrogen or a halogen,
wherein said metallocene derivative is admixed with an amount of a cocatalyst mixture effective to activate the metallocene derivative.

4. The process of claim 1, wherein $R_1$, $R_2$, and $R_3$ in the organotin compound are $C_1-C_{12}$ alkyl groups.

5. The process of claim 1, wherein said at least one organotin compound is selected from the group consisting of those with a general formulae:

$R_1R_2R_3Sn$—OH, and $R_1Sn(O)OH$.

6. The process of claim 5, in which
the metallocene derivative of a transition metal has the formula: $Cp_mMA_nB_p$ wherein
Cp is a cyclopentadienyl or a substituted cyclopentadienyl group;
m is 1 or 2;
M is a transition metal atom of a Group 4b or Group 5b of the Periodic Table and has a valence which is equal to m+n+p; and
each of A and B is selected from the group consisting of a halogen atom, a hydrogen atom, a $C_1-C_6$ alkyl group, or a group of the following general formula:

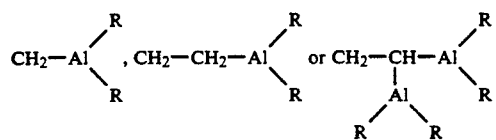

where R is a $C_1-C_{10}$ alkyl group, hydrogen or a halogen,
wherein said metallocene derivative is admixed with an amount of a cocatalyst mixture effective to activate the metallocene derivative.

7. The process of claim 6 wherein $R_1$, $R_2$, and $R_3$, in $R_1R_2R_3Sn$—OH are the same and are $C_1-C_{10}$ alkyl groups.

8. The process of claim 7 wherein $R_1R_2R_3Sn$—OH is trimethyltin hydroxide.

9. The process of claim 7 wherein $R_1$ and $R_2$ in $R_1R_2SnO$ are the same $C_1-C_{10}$ alkyl groups.

10. The process of claim 9, wherein $R_1R_2SnO$ is dimethyltin oxide.

11. The process of claim 9, wherein $R_1R_2SnO$ is di(n-butyl)tinoxide. oxide.

12. the process of claim 6, wherein $R_1$ in $R_1Sn(O)OH$ is a $C_1-C_{10}$ alkyl group.

13. The process of claim 6, wherein $R_1sn(O)OH$ is n-butyltin hydroxide oxide.

14. The process of claim 6, wherein the catalyst precursor is bis(cyclopentadienyl)zirconium dichloride.

15. The process of claim 6, wherein the catalyst precursor is bis(cyclopentadienyl)hafnium dichloride.

16. The process of claim 6, wherein the catalyst precursor is bis(cyclopentadienyl)titanium dichloride.

17. The process of claim 6, wherein the catalyst precursor is bis(indenyl)zirconium dichloride.

18. The process of claim 6, wherein the catalyst precursor is bis(cyclopentadienyl)zirconium dimethyl.

19. The process of claim 6, wherein the catalyst precursor is bis(cyclopentadienyl)zirconium hydridochloride.

20. The process of claim 1, where the metallocene compound of a transition metal is supported on a solid.

21. The process of claim 20, wherein the solid is silica.

22. The process of claim 1, wherein the ratios of the amounts of trimethylaluminum and an organotin compound are such that the Al:O molar ratio is about 1.01:1 to about 100:1.

23. The process of claim 1, wherein the amount of trimethylaluminum and an organotin compound are such that the Al:O molar ratio is about 1.1:1 to about 5:1.

24. The process of claim 1, wherein the amount of the cocatalyst and the catalyst precursor are such that the oxygen:transition metal molar ratio is about 500:1 to about 2,000:1.

25. The process of claim 1, wherein the organotin compound is $R_1R_2R_3SnOH$, $R_1R_2SnO$ or $R_1Sn(O)OH$, is solid, and is a support for the metallocene catalyst precursor.

26. The process of claim 1, wherein the organotin compound is selected from the group consisting of trimethyltin hydroxide, dimethyltin oxide, di(n-butyl)tin oxide, and n-butyltin hydroxide oxide.

27. The process of claim 1, wherein the feed comprises an alpha olefin of 3 to 10 carbon atoms.

28. The process of claim 1, wherein said at least one organotin compound is selected from the group consisting of those with a general formulae: $R_1R_2R_3Sn-OH$ and $R_1R_2SnO$.

29. The process of claim 28, in which the metallocene derivative of a transition metal has the formula: $Cp_mMA_nB_p$ wherein Cp is a cyclopentadienyl or a substituted cyclopentadienyl group;

m is 1 or 2;

M is a transition metal atom of a Group 4b or Group 5b of the Periodic Table and has a valence which is equal to $m+n+p$; and each of A and B is selected from the group consisting of a halogen atom, a hydrogen atom, a $C_1$-$C_6$ alkyl group, or a group of the following general formula:

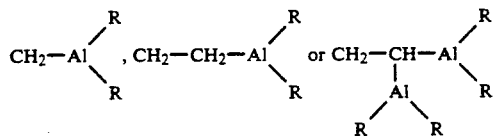

where R is a $C_1$-$C_{10}$ alkyl group, hydrogen or a halogen, wherein said metallocene derivative is admixed with an amount of a cocatalyst mixture effective to activate the metallocene derivative.

30. The process of claim 28, in which the cocatalyst consists of (i) and (ii).

31. The process of claim 1, in which the cocatalyst consists of (i) and (ii).

32. The process of claim 5, in which the cocatalyst consists of (i) and (ii).

* * * * *

UNITED STATES PATENT AND TRADEMARK OFFICE
CERTIFICATE OF CORRECTION

PATENT NO. : 5,258,475

DATED : November 2, 1993

INVENTOR(S) : Yury V. Kissin

It is certified that error appears in the above-identified patent and that said Letters Patent is hereby corrected as shown below:

Col. 11, line 2, Claim 1, "al(CH$_3$)3" should read --Al(CH$_3$)3--.

Col. 12, line 24, Claim 11, "di(n-butyl)tinoxide. oxide." should read --di(n-butyl)tin oxide--.

Col. 12, line 27, Claim 13, "R$_1$sn(O)OH" should read --R$_1$Sn(O)OH--.

Signed and Sealed this

Fourteenth Day of June, 1994

Attest:

BRUCE LEHMAN

*Attesting Officer*　　*Commissioner of Patents and Trademarks*